Dec. 26, 1950 P. LA POINTE 2,535,801
POTATO SEPARATING MACHINE
Filed May 13, 1947 4 Sheets-Sheet 1
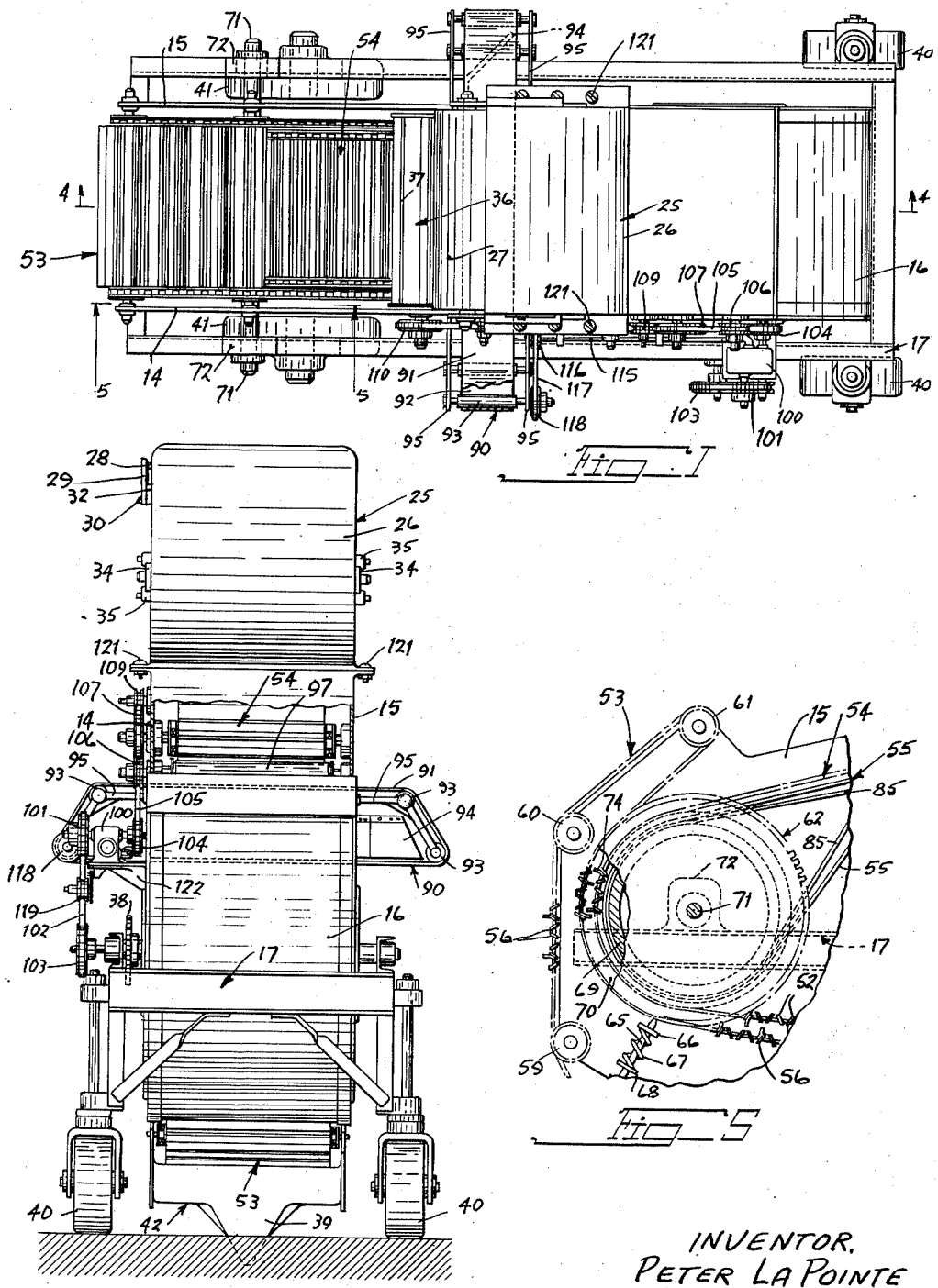
INVENTOR.
PETER LA POINTE
By Edward [signature]
ATTORNEY.

Dec. 26, 1950  P. LA POINTE  2,535,801
POTATO SEPARATING MACHINE
Filed May 13, 1947  4 Sheets-Sheet 2
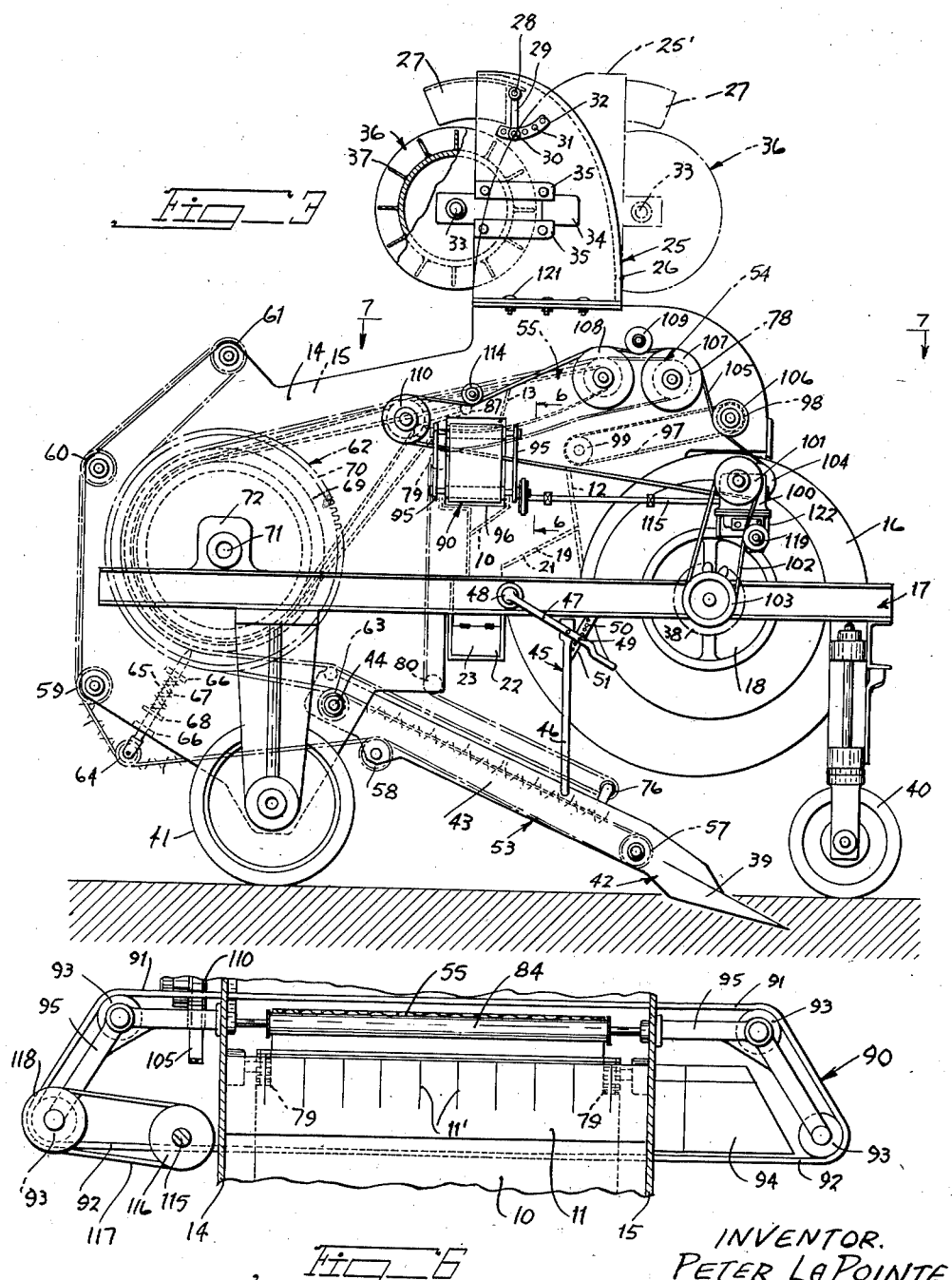
INVENTOR.
PETER LaPOINTE
BY Edward Gotham
ATTORNEY.

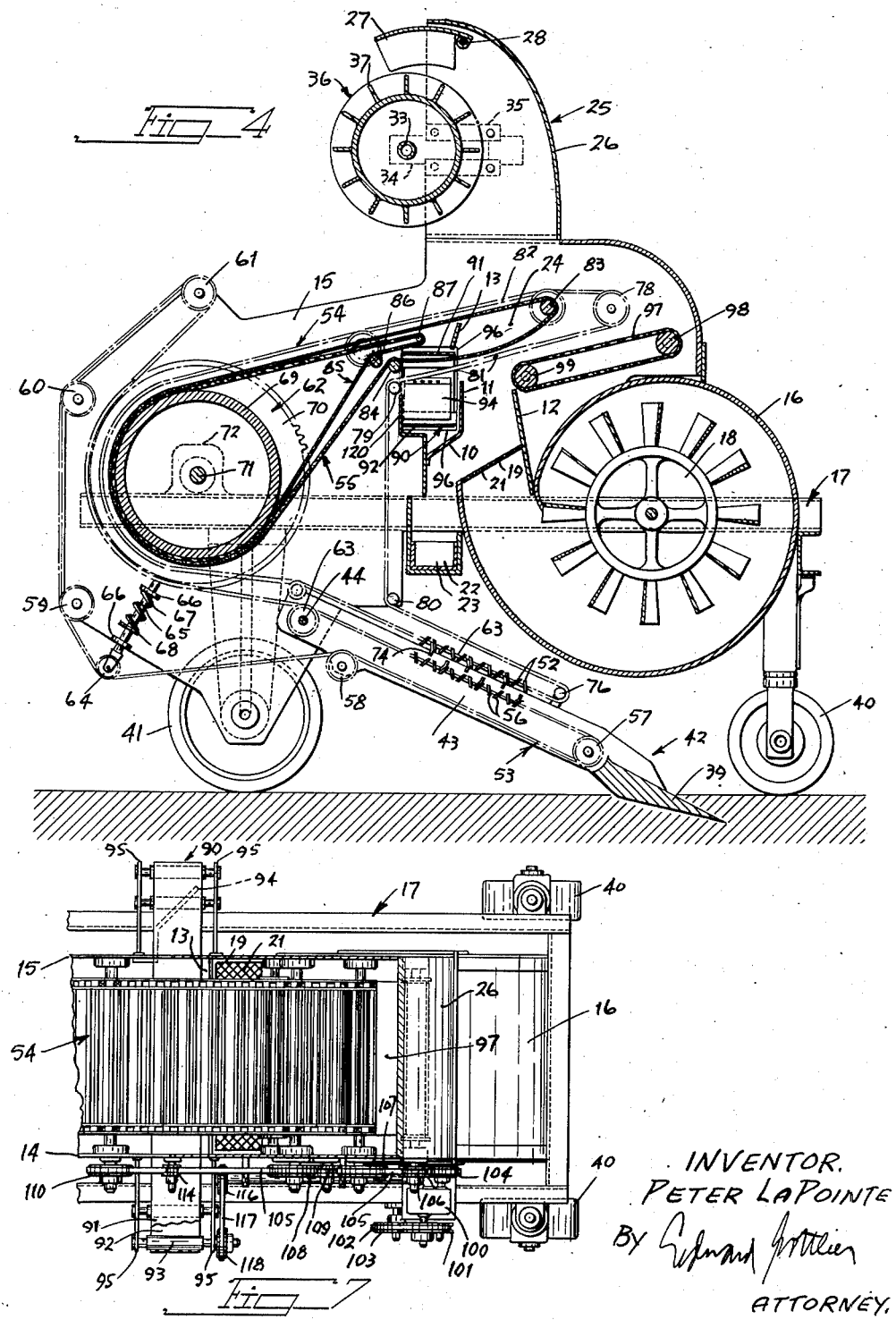

Dec. 26, 1950 P. LA POINTE 2,535,801
POTATO SEPARATING MACHINE
Filed May 13, 1947 4 Sheets-Sheet 4
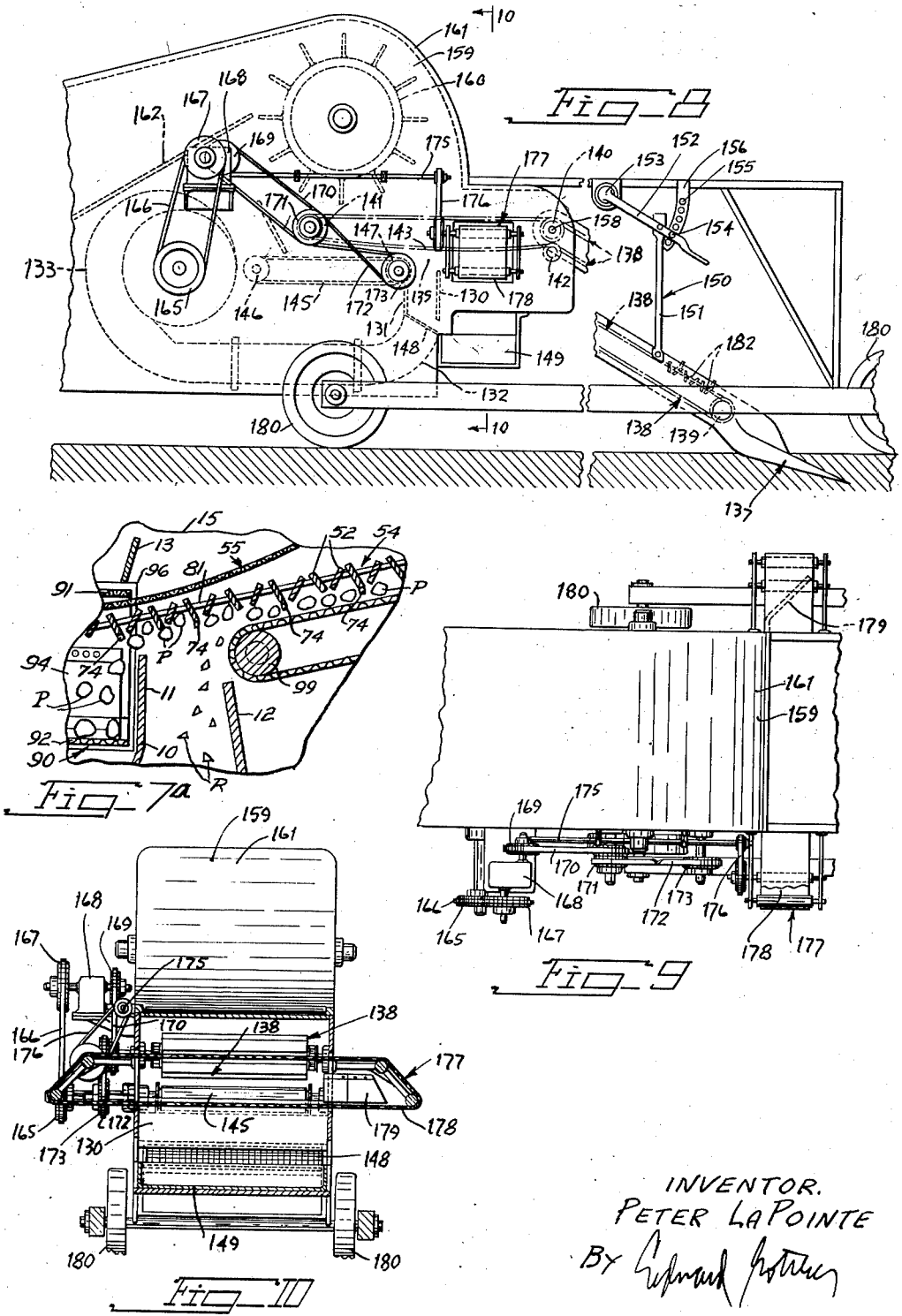
INVENTOR.
PETER LaPOINTE
ATTORNEY.

Patented Dec. 26, 1950

2,535,801

UNITED STATES PATENT OFFICE 2,535,801

POTATO SEPARATING MACHINE

Peter La Pointe, Brooklyn, N. Y.

Application May 13, 1947, Serial No. 747,645

9 Claims. (Cl. 209—470)

1

This invention relates to new and useful improvements in potato separating machines, and particularly relates to improvements in my potato separating machine disclosed in my pending patent application, Serial No. 633,504, filed December 7, 1945, matured into United States Letters Patent No. 2,448,446. I have discovered that the operation of my prior potato separating machine is somewhat critical in that the potatoes enter the stream of air at a downwardly directed angle and unless the air pressure and velocity of the stream is substantially correct the potatoes will either gather too much momentum and go down with the rocks and other heavy materials, or they may be blown upwards and be discharged with the potato tops, dirt and weeds, and the other light materials. However, when the pressure and velocity of the air stream is in a satisfactory range the potatoes will cross the air stream as desired, while the rocks fall down and the light material is blown upwards.

The present invention has for an important object to feed the potatoes into the air stream at substantially right angles to the air stream to avoid downward momentum from causing the potatoes to go down with the rocks.

Another important object of this invention resides in providing a porous conveying system having sections for conveying and guiding potatoes through the air stream, as desired.

More particularly, the invention proposes the provision of air guiding means for guiding the stream of air in a substantially vertical direction. It is proposed that this air guiding means be provided with a throat section in which the stream of air can float potatoes and in which heavy foreign materials, such as rocks, will fall down. It is also proposed that the air guiding means be provided with an air expanding section in which the potatoes will not float, but in which the light foreign materials, such as dirt, weeds and potato tops will be blown upwards. It is proposed that the conveying system be porous so that the air stream may pass through it. It is furthermore proposed that the conveying system be connected with a conventional potato digger for conveying potatoes and natural foreign materials in the soil as received from the digger through said air stream.

It is an important object of this invention to provide the porous conveying system with a potato carrying section extending substantially horizontally across the air expanding section of the air guiding means so that said current of air may

2 blow the light foreign materials upwards. Another object is to provide said porous conveying system with an overhead potato holding section extending substantially horizontally across said throat section so that said stream of air may float potatoes upwards against said overhead potato holding section for conveying the potatoes through said air stream, whereby the heavy foreign materials will fall downwards and become separated from the potatoes.

Another object of this invention resides in the provision of means for transferring the potatoes from said potato carrying section of the porous conveying system, referred to above, to the said overhead potato holding section.

It is also proposed to provide means above said air expanding section of the air guiding means for directing said stream of air laterally so that the light foreign materials may be guided and blown laterally to fall back to the ground.

The invention also proposes a new and novel cross unloading conveyor for removing the separated potatoes for making room for new separated potatoes, and thus making the potato separating machine continuous in operation.

Another object of this invention is to construct the air guiding means with rigid and flexible baffles for guiding the air stream and for facilitating the passage of the potatoes across the air stream.

The invention also contemplates certain innovations in the porous conveying system characterized particularly by the fact that the system includes a bar or equivalent conveying section with pockets, a wire mesh or equivalent conveying section, and a canvas or equivalent belt conveying section. It is proposed that the wire mesh conveying section be disposed beneath the bar conveying section for assisting in supporting the light foreign materials. It is proposed that the canvas belt conveying section be arranged to convey away the dirt from the bar and wire conveying sections as soon as feasible.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a potato separating machine constructed in accordance with this invention.

Fig. 2 is an end view of Fig. 1, looking from the right hand end.

Fig. 3 is a front elevational view of Fig. 1.

Fig. 4 is a sectional view taken on the line 4—4 of Fig. 1.

Fig. 5 is a fragmentary sectional view taken on the line 5—5 of Fig. 1.

Fig. 6 is a transverse sectional view taken on the line 6—6 of Fig. 3.

Fig. 7 is a fragmentary horizontal sectional view taken on the line 7—7 of Fig. 3.

Fig. 7a is a fragmentary sectional view similar to a portion of Fig. 4, to which has been added an illustrative showing of the potatoes being conveyed across the air stream while the rocks are falling down by gravity.

Fig. 8 is a fragmentary elevational view of a potato separating machine constructed in accordance with another form of this invention.

Fig. 9 is a fragmentary plan view of Fig. 8.

Fig. 10 is a fragmentary transverse sectional view taken on the line 10—10 of Fig. 8.

The potato separating machine, in accordance with this invention, includes air guiding means for guiding a stream of air in a substantially vertical direction. This air guiding means comprises a series of baffles 10, 11, 12 and 13 mounted transversely across vertical front and back walls 14 and 15, respectively. A blower 16 is provided for driving a current of air upwards through said air guiding means. The blower 16 is supported between the walls 14 and 15 and frame 17 of the machine. The blower 16 has the usual central air intake 18 and the peripheral air discharge 19. This air discharge 19 is disposed at the bottom of the said air guiding means for directing a current of air upwards between the baffles 10, 11, 12 and 13, and between the walls 14 and 15.

The baffle 11 is constructed of rubber or other flexible material, and is provided with a plurality of slits 11', see Fig. 6, extended downwards from its top edge so as to divide off small top portions which may easily flex to permit potatoes to pass, as will be hereinafter further described.

The baffles 10, 11 and 12 are positioned immediately above the air discharge 19 of the blower 16 and form a throat section in which the stream of air from the blower 16 is powerful enough to float potatoes, but in which heavy foreign materials, such as rocks, will fall down. The air discharge 19 of the blower 16 is covered with a suitable screen 21 arranged at a downwardly directed inclination so that the rocks and heavy materials will be guided downwards and rearwards and will discharge into a container 22 mounted between the walls 14 and 15. This container 22 is provided with a door 23 which gives access to it so that the rocks and heavy materials may be removed, as desired.

Directly above the baffles 11 and 12, the air guiding means is relatively open, forming an air expanding section at this area generally indicated by the reference numeral 24, in which potatoes will not float, but in which flight foreign materials such as dirt, weeds and potato tops will be blown upwards. Above the air expanding section there is a top housing 25 having a baffle wall 26 for guiding the stream of air upwards and rearwards of the potato separating machine. At the extreme top, the top housing 25 is provided with an adjustable exit baffle 27. This baffle 27 is pivotally supported upon a rod 28, one end of which is provided with a lever 29 having a screw 30 engageable with one of a series of openings 31 in an arcuate plate 32 mounted on the side of the top housing 25 and by which the adjustable baffle 27 may be adjusted.

The housing 25 has an open rear end across which a rotary potato top thrower 36 is mounted. This rotary potato top thrower 36 is in the nature of a large drum having radial vanes 37. The rotary potato top thrower 36 is supported on a shaft 33 mounted upon adjustable supports 34 mounted on tracks 35 on the sides of the top housing 25. The stream of air discharged by the blower 16 will travel upwards through the top housing 25 and will drive, that is, rotate the potato top thrower 36 to assist in throwing the light foreign materials to the rear of the potato separating machine. The blower 16 is provided with a drive sprocket 38 by which it may be operated. It is proposed that this drive sprocket 38 be connected with an engine which may be mounted on the main frame 17, or with the engine of a tractor used for moving the potato separating machine around.

The main frame 17 is supported at the front by swivel front wheels 40. At the back it has back wheels 41. A potato digger 42 is mounted on the bottom portion of the main frame 17. This potato digger 42 includes a digger shovel 39 connected with a digger frame 43 which is pivotally supported by a shaft 44 mounted across the walls 14 and 15. The potato digger 42 is associated with a digger elevator 45 by which it may be raised and lowered. This digger elevator 45 includes a vertical support rod 46 connected with a control lever 47 which is pivotally mounted at its rear end 48 on the main frame 17. The lever 47 is held in various positions by a pin 49 engaging one of series of openings 50 upon a stationary support bar 51 mounted on said main frame 17.

A porous conveying system is connected with said digger 42 for conveying potatoes and foreign materials found in the soil as received from the digger shovel 39 through the air stream discharged by the blower 16. More particularly, the porous conveying system consists of a number of conveyors, namely, conveyors 53, 54 and 55. The conveyor 53 is in the nature of an endless conveyor including a plurality of spaced adjacent potato supporting cross bars 56 arranged at angles to each other to form pockets for holding potatoes. The conveyor 53 extends around front wheels 57 mounted on the digger frame 43 immediately to the rear of the digger shovel 39 so as to receive the material from the digger shovel 40. The conveyor 53 then extends rearwards over a series of guiding wheels 58, 59, 60 and 61, and partially around a conveyor guiding drum 62. The wheels 58 are mounted on the digger frame 43, and the wheels 59, 60 and 61 are mounted on the walls 14 and 15. The conveyor 53 is driven by drive sprockets 63 mounted on the shaft 44 which may be driven by a prime mover, or said shaft may be connected with the engine of the tractor, not shown.

The conveyor 53 is kept in a tightly stretched position by resiliently mounted idler wheels 64. These wheels 64 are mounted upon rods 65 slidably mounted upon brackets 66 on the walls 14 and 15. Springs 67 are mounted coaxially on the rods 65 and act between certain of the brackets 66 and collars 68 mounted on the rods 65 for urging the rods 65 outwards. In the event that large rocks and other large materials are picked up by the conveyor 53, these materials may travel around the conveyor drum 62 without damage to the potato separating machine because the springs 67 will merely be compressed as the conveyor 53 adjusts itself. The conveyor drum 62 has a central cylindrical section 69 and end flanges 70 with sprocket teeth. The conveyor 53 is guided upon the sprocket teeth of the end flanges 70. The drum 62 is mounted upon an axle 71 which is supported in bearings 72 mounted on the main frame 17.

The conveyor 54 is also an endless conveyor. It includes a plurality of bars 52 at angles to each other forming pockets for receiving the potatoes. Said conveyor 54 also includes a plurality of rubber baffles 74 spaced from each other at distances of about 10" or so, and projecting from the carrying surface of the conveyor. The endless conveyor 54 extends over a series of guiding wheels mounted on the walls 14 and 15 and on the digger frame 43. The path of the endless conveyor 54 may be traced by starting at the wheels 76 which are positioned directly to the rear of the digger shovel 39 so that a section of the conveyor 54 is positioned above a section of the conveyor 53. The bottom section of the conveyor 54 extends rearwards from the wheels 76, then partially around the cylindrical portion 69 of the conveyor drum 62 and then through the air expanding section 24 of the air guiding means for the air stream of the blower 16 to a position around the wheels 78. The conveyor 54 then continues around the wheels 79 and 80 and back to the said wheels 76.

The main purpose of the endless conveyor 54 is to form what we may call an overhead potato holding section 81 extending across the throat section of the air guiding means for the stream of air produced by the blower 16. The potatoes will be blown up against this section 81 of the conveyor 54 which moves across the stream of air. The main purpose of the pockets in the conveyor 54 and the rubber baffles 74 is to sweep the potatoes through the air stream at this section 81. It should be noted that another section of the conveyor 54, indicated by the reference numeral 82, and located above the section 81 is located in the air expanding section 24 of the air guiding means. It is at this section 82 that the light materials will be blown upwards. The conveyor 54 also assists the conveyor 53 in conveying upwards the potatoes and foreign materials because sections of these conveyors are parallel to each other, extending from the digger shovel 39 backwards and upwards partially around the conveyor drum 62, and at the top the conveyor 53 will transfer its load of potatoes and foreign materials to conveyor 54.

The conveyor 55 is in the nature of an endless wire screen conveyor. The conveyor 55 extends around wheels 83 and is guided by wheels 84 and then extends partially around the conveyor drum 62 beneath the conveyor 54. The wheels 83 and 84 are mounted on the walls 14 and 15. It should be noted that sections of the conveyor 55 also cross the air stream of the blower 16 at points close to the conveyor sections 81 and 82. The purpose of the wire screen conveyor 55 is to support weeds and other relatively large light foreign materials so as to convey them across the air stream to be blown upwards.

A dirt handling conveyor 85 is disposed beneath a section of the wire screen conveyor 55. More particularly, the dirt handling conveyor 85 is in the nature of an endless canvas belt. It extends partially around the cylindrical portion 69 of the conveyor drum 62 beneath the wire mesh conveyor 55. The conveyor 85 is guided by wheels 86 and 87 mounted on the walls 14 and 15. It should be noted that the dirt handling conveyor 85 does not extend across the air stream but will discharge dirt upon the top of an endless cross conveyor 90. This endless cross conveyor 90 is located directly to the rear of the baffle 11. The conveyor 90 has a top section 91 and a bottom section 92. It is guided over a group of wheels 93 on brackets 95 mounted on the walls 14 and 15. The ends of the cross conveyor 90 extend out through openings 96 in the walls 14 and 15.

The dirt which is deposited upon the top section 91 by the dirt handling conveyor 85 will be thrown off to the side of the potato separating machine. The potatoes that cross the air stream with the help of the pockets and baffles 74 of the conveyor 54, at the section 81 will be discharged upon the top of the bottom section 92 of the cross conveyor 90. The baffle 11 is necessary to properly guide the air stream, but it is also necessary that the potatoes pass the baffle 11. For this reason the baffle 11 is flexible, preferably made of rubber. The potatoes which are discharged upon the bottom section 92 of the cross conveyor 90 will be engaged against a stationary inclined discharge blade 94 which will direct the potatoes off the bottom section 92 into storage containers or receptacles, such as bags, not illustrated on the drawing.

Certain sections of the conveyors 53 and 54 support and carry the potatoes and the foreign materials as received from the digger shovel 39. These portions of these conveyors may be called carrying sections, or a carrying section. A means is provided for transferring the potatoes and foreign materials from said carrying section of the conveyors to the said overhead potato holding conveyor section 81. This transferring means is in the nature of an endless conveyor 97. The conveyor 97 extends around wheels 98 and 99 mounted on the walls 14 and 15. The top of the conveyor 97 is parallel to a section of the conveyor 54 directly to the front of the conveyor section 81. The potatoes and foreign materials which come along on the conveyor 54 will be dropped on to the conveyor 97 which will then convey said materials towards the air stream and against the bottom of the said overhead potato holding conveyor section 81.

A suitable drive is provided for the various conveyors. This drive includes a gear reduction drive unit 100. The gear reduction drive unit 100 is driven by a pulley 101 connected by a belt 102 with a pulley 103 upon the shaft of the blower 16. Consequently, when the blower 16 is driven, the gear reduction drive unit 100 will be driven. The gear reduction drive unit 100 has a driven pulley 104 over which an endless drive belt 105 extends. This drive belt 105 extends against a drive pulley 106 connected to drive the conveyor 97. It also extends over drive pulleys 107 and 108. The drive pulley 107 is connected to drive the conveyor 54 while the drive pulley 108 drives the conveyor 55. An idler pulley 109 mounted on the wall 14 holds the endless belt 105 tightly against the pulleys 107 and 108.

The endless belt 105 continues over a pulley 110 which is mounted on the wall 14. The endless belt 105 after leaving the pulley 108 is guided by an idler pulley 114 mounted on the wall 14, and then engages over the said pulley 110 and returns back to the starting pulley 104. The gear reduction drive unit 100 is also provided with a driven shaft 115 which is rotatively supported upon the wall 14 and which is provided with a pulley 116 provided with a belt 117 engaging a pulley 118 which drives the cross conveyor 90. The belt 102 is tensioned by an idler pulley 119, mounted on a bracket 122 which is mounted on the side of the blower 16. The bracket 122 supports the drive unit 100.

A stationary baffle 120 is mounted across the walls 14 and 15 to the back side of the cross conveyor 90 for preventing the potatoes which are discharged upon the top of the bottom section 92 of the cross conveyor 90 from falling off. The top housing 25 is mounted in position by fastening elements 121 engaging adjacent flanges upon the housing 25 at the top portions of the walls 14 and 15. If desired, the direction of discharge of the top housing 25 may be changed by removing the fastening elements 121 and changing the direction on the housing 25. For example, it may be turned around 180°, as indicated by the dot and dash lines 25'. It may then be secured in position. Now the stream of air will be directed to the front of the potato separating machine.

The operation of the potato separating machine may be understood from the following:

The potato separating machine is drawn forwards so that the digger 42 digs the potatoes and adjacent soil which is forced upon the shovel 39 and on to the conveyor 53. This material will be forced upon the top of the conveyor 53 which will carry it rearwards and upwards. A section of the conveyor 54 extends along the adjacent section of the conveyor 53 for assisting the conveying operation. The material will be conveyed rearwards and then upwards around the conveyor drum 62 and then will be transferred on to and continue along the top of the conveyor 54. As this material progresses dirt and small particles will fall down through the conveyor 54 and through the wire screen conveyor 55 upon the dirt handling conveyor 85. This dirt will be discharged on the top of the cross conveyor 90 which will discharge it to the side of the potato separating machine. The potatoes and larger particles will continue to be carried by the top section of the conveyor 54 and the wire screen conveyor 55, and they will be carried across the air expanding section of the air guiding means for the stream of air from the blower 16, at which point all light materials will be blown upwards through the housing 25. If the soil does not contain rocks the potatoes may be removed from the conveyor 54 before they are dropped on to the conveyor 97. If the soil contains rocks, the potatoes and rocks proceed to and are deposited on the conveyor 97.

The conveyor 97 in conjunction with the overhead potato holding section 81 of the conveyor 54 will actually force the potatoes and rocks into the air stream, see particularly Fig. 7ª in which the potatoes are illustrated and indicated by letter "P" and the rocks by letter "R". The rocks R and heavy material will fall downwards and will be guided by the screen 21 and will discharge into the receptacle 22. The potatoes will be blown upwards against the pockets between the bars 52 and between the rubber baffles 74 of the overhead potato holding conveyor section 81 of the conveyor 54. The said pockets between the bars 52 and the rubber baffles 74 of the conveyor 54 will actually carry the potatoes across the air stream. The potatoes will be forced past the baffle 11 which is constructed of rubber or other flexible material and which is also provided with slits 11' extended downwards from its top edge. As soon as the potatoes pass the baffle 11 they will be past the air stream and then the potatoes will drop because of gravity upon the bottom section 92 of the cross conveyor 90. From the bottom section 92 the potatoes will be guided by the blade 94 and will be discharged into suitable receiving bags or receptacles.

The blower 16 is driven by an engine, or other driving device which will rotate the sprocket wheel 38. This drives the rotor of the blower 16. The air stream produced by the blower 16 will be discharged upwards through the air guiding means consisting of the baffles 10, 11, 12 and 13. Because the area between the baffles 10 and 11, and the baffle 12 is relatively small, we may consider this area as the throat section of the air guiding means. In this throat section the air pressure and velocity is strong enough to blow the potatoes upwards against the overhead holding conveyor section 81. The air continues upwards because the conveyors 54 and 55 are porous, and the air will eventually discharge from the top housing 25. Immediately above the baffle 11 the air is capable of expanding so that at the conveyor section 82 it has already expanded and is incapable of blowing the potatoes. However, it is sufficiently strong to blow the potato tops, weeds and light materials which will be blown upwards through the top housing 25.

Rotations of the sprocket 38 will be transmitted by the belt 102 to drive the gear reduction drive unit 100. This gear reduction drive unit 100 in turn drives the pulley 104 and the shaft 115. The pulley 104 drives the endless belt 105, which in turn indirectly drives the conveyors 97, 54 and 55. The drive sprockets 63, driven by means not shown on the drawing, will drive the endless conveyor 53. Because of the driven endless conveyors 53 and 54 the conveyor drum 62 will be rotated and this drum in turn drives the dirt handling conveyor 85. The shaft 115 indirectly drives the cross conveyor 90.

In Figs. 8–10 inclusive, a modified form of the invention has been disclosed. The potato separating machine includes air guiding means characterized by baffles 130 and 131 mounted between the side walls of a housing 159 for guiding a stream of air from a discharge conduit 132 which is connected with a blower 133, in a substantially vertical direction. The air guiding means is provided with a throat section 135 in which the stream of air can float potatoes and in which heavy foreign materials such as rocks will fall down, while light foreign material such as the potato top, dirt and weeds will blow upwards. A potato digger 137 is connected, by a porous conveying system including a conveyor 138, with said throat section 135 for conveying potatoes, potato tops, rocks and dirt as received from said digger 135 through the said air stream. The conveyor 138 is constructed with inclined bars 182 forming pockets for the potatoes. Said conveyor 138 is guided over wheels 139 immediately adjacent the digger shovel and extends upwards and rearwards and is guided over wheels 140, 141 and 142. The top section of the conveyor 138 extends across the air stream of the air guiding means. The conveyor 138 has a section 143 comprising an overhead potato holding conveyor section extending substantially horizontally across the throat section 135 of the air guiding means for guiding potatoes across said stream of air, which are floated upwards against said overhead potato holding conveyor section 143 by said stream of air.

Means is provided for transferring the potatoes from the conveyor 138 to beneath said overhead potato holding conveyor section 143. This means comprises a transferring conveyor 145. The transferring conveyor 145 is extended between wheels 146 and 147. The discharge of the conduit 132 is provided with an inclined screen 148 adapted to direct rocks and heavy material downwards into a collecting box 149.

The potato digger 137 is associated with a digger elevator 150 which includes a support rod 151 pivotally connected with the frame of the digger 137 and pivotally connected with a lever 152. The lever 152 is pivotally supported at its back end 153. Its front end is associated with a pintle 154 cooperative with a group of openings 155 upon a support bar 156. The frame of the digger 137 is pivotally connected by a pintle member 158 with the housing 159 of the potato separating machine.

The blower 133 is mounted within the housing 159. A rotary potato top thrower 160 is also mounted within the housing 159 directly above the air stream. The housing 159 has a curved baffle wall 161 to direct the stream rearwards. The thrower 160 will throw the light particles rearwards and downwards as guided by another baffle 162 mounted within the housing 159. A pulley 165 is mounted upon the shaft of the blower 133 and connects with a belt 166 which is connected with the drive pulley 167 of a gear reduction drive unit 168. This gear reduction drive unit 168 is provided with a driven pulley 169 connected by a belt 170 with a pulley 171 connected for driving the conveyor 138. A cross belt 172 drives a pulley 173 which drives the conveyor 145. The gear reduction drive unit 168 is also provided with a driven shaft 175 rotatively supported upon the housing 159 and connected by a belt 176 to drive a cross conveyor 177. The cross conveyor 177 is for the purpose of removing the separated potatoes. The potatoes will be discharged upon the bottom section 178 of the cross conveyor. An inclined plate 179 directs the potatoes off the cross conveyor 177. The housing 159 is supported upon wheels 180.

The operation of this form of the invention may be understood from the following:

When the potato separating machine is drawn forwards the potato digger 137 will dig up the potatoes and earth which will be forced upon the conveyor 138, which will convey same rearwards and upwards and then through the air stream from the blower discharge conduit 132. The potato tops, weeds, dirt and other light materials will be blown upwards to the thrower 160 which will throw them rearwards along the housing 159 and a baffle 162. The potatoes and heavy materials from the conveyor 138 then continue to the transfer conveyor 145 which then moves them into the air stream. The rocks and heavy materials will fall downwards and will be guided by the inclined screen 148 into the receptacle 149. The potatoes will be floated upwards against the pockets of the bottom overhead potato holding conveyor section 143 of the conveyor 138 which will move the potatoes over the bottom section 178 of the cross conveyor 177 and then the potatoes will be past the baffle 130 and out of the air stream, whereupon the potatoes will fall due to gravity upon said bottom section 178 of the cross conveyor 177. The inclined bars 182 of the conveyor 138 will assist the conveyor 138 in traversing the potatoes across the air stream and discharging them upon the bottom section 178 of the cross conveyor 177. The inclined plate 179 will remove the potatoes from the cross conveyor 177.

The blower 133 is driven by some prime mover, not illustrated on the drawing. Rotations of the rotor of the blower 133 will drive the pulley 165, which because of the belt 166 will drive the gear reduction drive unit 168 which drives the conveyors 138, 145 and 177.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a potato separating machine, air guiding means for guiding a stream of air in substantially a vertical direction and having a throat section in which the stream of air can float potatoes and in which heavy foreign materials such as rocks will fall down and also having an air expanding section in which the potatoes will not float but in which light foreign materials such as the potato tops, dirt and weeds will blow upwards, means for driving a current of air upwards through said air guiding means, a porous conveying system for connection with a digger for conveying potatoes and foreign materials in the soil as received from said digger through said air stream and having a carrying section extending substantially horizontally across said air expanding section so that said current of air may blow the light foreign materials upwards, and said porous conveying system also having an overhead potato holding conveyor section extending substantially horizontally across said throat section so that said stream of air may float potatoes upwards against said overhead potato holding conveyor section for conveying the potatoes through said air stream while the heavy foreign materials will fall downwards and become separated from the potatoes, and means for transferring the potatoes from said carrying section to said overhead potato holding conveyor section.

2. In a potato separating machine, air guiding means for guiding a stream of air in substantially a vertical direction and having a throat section in which the stream of air can float potatoes and in which heavy foreign materials such as rocks will fall down and also having an air expanding section in which the potatoes will not float but in which light foreign materials such as the potato tops, dirt and weeds will blow upwards, means for driving a current of air upwards through said air guiding means, a porous conveying system for connection with a digger for conveying potatoes and foreign materials in the soil as received from said digger through said air stream and having a carrying section extending substantially horizontally across said air expanding section so that said current of air may blow the light foreign materials upwards, and said porous conveying system also having an overhead potato holding conveyor section extending substantially horizontally across said throat section so that said stream of air may float potatoes upwards against said overhead potato holding conveyor section for conveying the potatoes through said air stream while the heavy foreign materials will fall downwards and become separated from the potatoes, and means for transferring the potatoes from said carrying section to said overhead potato holding conveyor section, said air guiding means including a series of baffles.

3. In a potato separating machine, air guiding means for guiding a stream of air in substantially a vertical direction and having a throat section in which the stream of air can float potatoes and in which heavy foreign materials such as rocks will fall down and also having an air expanding section in which the potatoes will not float but in which light foreign materials such as the potato tops, dirt, and weeds will blow upwards, means for driving a current of air upwards through said air guiding means, a porous conveying system for connection with a digger for conveying potatoes and foreign materials in the soil as received from said digger through said air stream and having a carrying section extending substantially horizontally across said air expanding section so that said current of air may blow the light foreign materials upwards, and said porous conveying system also having an overhead potato holding conveyor section extending substantially horizontally across said throat section so that said stream of air may float potatoes upwards against said overhead potato holding conveyor section for conveying the potatoes through said air stream while the heavy foreign materials will fall downwards and become separated from the potatoes, means for transferring the potatoes from said carrying section to said overhead potato holding conveyor section, and a cross conveyor adjacent said air guiding means for receiving by gravity potatoes moved across said air stream and conveying away said separated potatoes.

4. In a potato separating machine, air guiding means for guiding a stream of air in substantially a vertical direction and having a throat section in which the stream of air can float potatoes and in which heavy foreign materials such as rocks will fall down and also having an air expanding section in which the potatoes will not float but in which light foreign materials such as the potato tops, dirt and weeds will blow upwards, means for driving a current of air upwards through said air guiding means, a porous conveying system for connection with a digger for conveying potatoes and foreign materials in the soil as received from said digger through said air stream and having a carrying section extending substantially horizontally across said air expanding section so that said current of air may blow the light foreign materials upwards, and said porous conveying system also having an overhead potato holding conveyor section extending substantially horizontally across said throat section so that said stream of air may float potatoes upwards against said overhead potato holding conveyor section for conveying the potatoes through said air stream while the heavy foreign materials will fall downwards and become separated from the potatoes, means for transferring the potatoes from said carrying section to said overhead potato holding conveyor section, a cross conveyor adjacent said air guiding means for receiving and conveying away said separated potatoes, and a flexible baffle between said cross conveyor and said air stream, said flexible baffle being adapted to bend and allow potatoes to pass.

5. In a potato separating machine, air guiding means for guiding a stream of air in substantially a vertical direction and having a throat section in which the stream of air can float potatoes and in which heavy foreign materials such as rocks will fall down and also having an air expanding section in which the potatoes will not float but in which light foreign materials such as the potato tops, dirt and weeds will blow upwards, means for driving a current of air upwards through said air guiding means, a porous conveying system for connection with a digger for conveying potatoes and foreign materials in the soil as received from said digger through said air stream and having a carrying section extending substantially horizontally across said air expanding section so that said current of air may blow the light foreign materials upwards, and said porous conveying system also having an overhead potato holding conveyor section extending substantially horizontally across said throat section so that said stream of air may float potatoes upwards against said overhead potato holding conveyor section for conveying the potatoes through said air stream while the heavy foreign materials will fall downwards and become separated from the potatoes, and means for transferring the potatoes from said carrying section to said overhead potato holding conveyor section, said porous conveying system including a conveyor drum, and several conveyors engaged about said drum.

6. In a potato separating machine, air guiding means for guiding a stream of air in substantially a vertical direction and having a throat section in which the stream of air can float potatoes and in which heavy foreign materials such as rocks will fall down and also having an air expanding section in which the potatoes will not float but in which light foreign materials such as the potato tops, dirt and weeds will blow upwards, means for driving a current of air upwards through said air guiding means, a porous conveying system for connection with a digger for conveying potatoes and foreign materials in the soil as received from said digger through said air stream and having a carrying section extending substantially horizontally across said air expanding section so that said current of air may blow the light foreign materials upwards, and said porous conveying system also having an overhead potato holding conveyor section extending substantially horizontally across said throat section so that said stream of air may float potatoes upwards against said overhead potato holding conveyor section for conveying the potatoes through said air stream while the heavy foreign materials will fall downwards and become separated from the potatoes, and means for transferring the potatoes from said carrying section to said overhead potato holding conveyor section, comprising a conveyor beneath said carrying section and terminating adjacent said throat section of the air guiding means.

7. A potato separating machine as defined in claim 1, including a top housing above said air expanding section, said top housing having a baffle wall for guiding said stream of air upwards and rearwards, a rotary potato top thrower mounted in said housing, and said thrower comprising a rotatively mounted drum having radial fins and positioned with one side thereof in said air stream and rotative in the direction of travel of said air stream.

8. A potato separating machine as defined in claim 7, including a shaft for rotatively supporting said thrower, and adjustable supports mounted on said top housing and supporting said shaft in order that the position of said thrower in said air stream may be varied.

9. A potato separating machine as defined in claim 7, including an exit baffle for directing the discharge of said stream of air from said top housing, a rod supporting said baffle on said top housing, and means for holding said rod in selected turned positions for adjusting the position of said exit baffle.

PETER LA POINTE.

REFERENCES CITED

The following references are of record in the file of this patent:

UNITED STATES PATENTS

| Number | Name | Date |
|---|---|---|
| 176,950 | Gite | May 2, 1876 |
| 1,107,965 | Klinghammer | Aug. 18, 1914 |
| 1,159,110 | Silberberg | Nov. 2, 1915 |
| 1,913,877 | Frederick | June 13, 1933 |
| 1,923,977 | Hewitt | Aug. 22, 1933 |
| 2,074,515 | Pyatt | Mar. 23, 1937 |
| 2,095,428 | Batie | Oct. 12, 1937 |
| 2,269,298 | Widuch | Jan. 6, 1942 |
| 2,277,450 | Parr | Mar. 24, 1942 |
| 2,448,446 | La Pointe | Aug. 31, 1948 |
| 2,458,224 | Thompson | Jan. 4, 1949 |

FOREIGN PATENTS

| Number | Country | Date |
|---|---|---|
| 43,683 | Sweden | Jan. 26, 1916 |
| 73,443 | Sweden | Feb. 22, 1928 |